(12) United States Patent
Kobayashi et al.

(10) Patent No.: US 12,047,627 B2
(45) Date of Patent: Jul. 23, 2024

(54) ENCODING DATA GENERATION METHOD, ENCODING DATA GENERATION APPARATUS AND PROGRAM

(71) Applicant: NIPPON TELEGRAPH AND TELEPHONE CORPORATION, Tokyo (JP)

(72) Inventors: Daisuke Kobayashi, Musashino (JP); Ken Nakamura, Musashino (JP); Kazuhisa Yamagishi, Musashino (JP); Taichi Kawano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 17/785,021

(22) PCT Filed: Dec. 16, 2019

(86) PCT No.: PCT/JP2019/049136
§ 371 (c)(1),
(2) Date: Jun. 13, 2022

(87) PCT Pub. No.: WO2021/124387
PCT Pub. Date: Jun. 24, 2021

(65) Prior Publication Data
US 2023/0353808 A1    Nov. 2, 2023

(51) Int. Cl.
*H04N 21/00* (2011.01)
*H04N 21/2343* (2011.01)
*H04N 21/24* (2011.01)
*H04N 21/2662* (2011.01)

(52) U.S. Cl.
CPC ..... *H04N 21/2662* (2013.01); *H04N 21/2343* (2013.01); *H04N 21/2407* (2013.01)

(58) Field of Classification Search
CPC .......... H04N 21/2662; H04N 21/2343; H04N 21/2407
See application file for complete search history.

(56) References Cited

U.S. PATENT DOCUMENTS

| 2015/0127848 A1* | 5/2015 | Houdaille .......... H04N 21/8456 709/233 |
| 2018/0027293 A1* | 1/2018 | Yamamoto ............ H04L 65/612 725/86 |

FOREIGN PATENT DOCUMENTS

| JP | 2015520966 A | 7/2015 |
| WO | WO-2016125415 A1 | 8/2016 |

OTHER PUBLICATIONS

Information technology—Dynamic adaptive streaming over HTTP (DASH)-Part 1: Media presentation description and segment formats, ISO/IEC23009-1, Aug. 2019, pp. 8-13, pp. 137-138.
(Continued)

*Primary Examiner* — Zhihan Zhou
(74) *Attorney, Agent, or Firm* — Harness, Dickey & Pierce, P.L.C.

(57) ABSTRACT

A coded data generation method of generating coded data of a plurality of bit rates in which an image is encoded includes the steps of: acquiring an evaluated value at distribution destinations of the generated coded data when the coded data is reproduced; and changing the bit rate of the coded data to be generated based on a distribution of the acquired evaluated value in all channels.

10 Claims, 8 Drawing Sheets

(56) References Cited

OTHER PUBLICATIONS

HTTP Live Streaming, Independent Submission, Request for Comments: 8216, Aug. 2017, https://tools.ietf.org/html/rfc8216.
Motohiro Takagi et al., Optimized Spatial and Temporal Resolution based on Subjective Quality Estimation without Encoding, VCIP(Visual Communications and Image Processing), Dec. 7, 2014, pp. 33-36.
Te-Yuan Huang et al., A Buffer-Based Approach to Rate Adaptation: Evidence from a Large Video Streaming Service, ACM SIGCOMM, 2014, Aug. 17, 2014.

* cited by examiner

ENCODING DATA GENERATION METHOD, ENCODING DATA GENERATION APPARATUS AND PROGRAM

CROSS-REFERENCE TO RELATED APPLICATIONS

This application is a 371 U.S. National Phase of International Application No. PCT/JP2019/049136, filed on Dec. 16, 2019. The entire disclosure of the above application is incorporated herein by reference.

TECHNICAL FIELD

The present invention relates to a coded data generation method, a coded data generation apparatus, and a program.

BACKGROUND ART

In recent years, mobile information terminals such as smartphones and tablet terminals have become ubiquitous. In addition, in recent years, communication systems in compliance with wireless communication standards such as 3G (3rd Generation: 3rd generation mobile telecommunication systems), LTE (Long Term Evolution), and 4G (4th Generation: 4th generation mobile telecommunication systems) are in widespread use. With the proliferation of such mobile telecommunications, there is a need to perform stable video distribution even in unstable network environments.

In addition, recently, video distribution services and the like that cater to general households and the like via optical lines distribute videos with ultra-high definition such as 4K or 8K. 4K has a resolution of 3840 pixels×2160 lines which is four times the resolution of HD (High Definition: high definition video) with a resolution of 1920 pixels×1080 lines. In addition, 8K has a resolution of 7680 pixels×4320 lines which is four times the resolution of 4K.

In the distribution of such ultra-high definition video, video coding specified by international video coding standards such as H.264/AVC (Advanced Video Coding) and H.265/HEVC (High Efficiency Video Coding) enables an amount of video data during distribution to be reduced. However, since optical lines for general households are best-effort services, there is not enough bandwidth to compress video data down to a bit rate that enables video distribution to be performed in a stable manner while maintaining quality of experience (QoE) (in other words, subjective quality) of a user. Therefore, in a similar manner to video distribution in mobile telecommunications described earlier, even in video distribution of such ultra-high definition video, there is a need to perform stable video distribution even in unstable network environments.

Conventionally, as video coding systems that enable stable video distribution to be performed even in unstable network environments such as the Internet, the MPEG-DASH (MPEG-Dynamic Adaptive Streaming over HTTP) system (refer to NPL 1) and the HLS (HTTP Live Streaming) system (refer to NPL 2) have been standardized as international standards.

In the MPEG-DASH system and the HLS system, distribution control according to an ABR (Adaptive Bitrate) distribution system is performed. The ABR distribution system is a video distribution system in which a video stream is divided into segment files at intervals of several seconds to several ten seconds and, in accordance with a network status or the like of a video-viewing user, video distribution is performed by dynamically switching bit rates in units of segment files. For example, the ABR distribution system performs distribution control so that video distribution is performed at a low bit rate with respect to a user who plays back a distributed video at a slow communication speed but video distribution is performed at a high bit rate with respect to a user who plays back a distributed video at a high communication speed. Therefore, an encoder that performs video distribution is required to perform video coding in each of a plurality of bit rates with respect to a single piece of video data.

Conventionally, in the ABR distribution system, a CBR (Constant Bitrate: fixed transmission rate) system is used in which coding is performed at a plurality of fixed bit rates determined in advance by a service provider. In comparison, since a throughput of a best-effort network varies in many ways depending on a time slot, usage, and the like, distribution is desirably performed using a larger number of bit rates in order to perform stable video distribution. However, there is a limit to a simultaneous processing performance of the encoder that performs video distribution and, since facility cost of a video distribution facility of the service provider increases, it is difficult to set too many channels. Therefore, bit rates that enhance the quality of experience (QoE) of a video-viewing user must be set within a limited number of channels.

Conventionally, several video coding systems that enhance the quality of experience of a video-viewing user have been proposed. Examples of proposed video coding systems include a subjective quality estimation system in which an optimal resolution and an optimal frame rate are determined based on a bit rate (refer to NPL 3) and a bit rate selective control system in which a bit rate suitable for a video-viewing terminal is selected based on a data amount of buffer data downloaded to the video-viewing terminal (refer to NPL 4).

CITATION LIST

Non Patent Literature

[NPL 1] "Information technology-Dynamic adaptive streaming over HTTP (DASH)—Part 1: Media presentation description and segment formats", INTERNATIONAL STANDARD ISO/IEC23009-1, pp. 8-13, 137-138, August 2019.
[NPL 2] "HTTP Live Streaming", [online], RFC 8216, IETF, August 2017, [retrieved Sep. 24, 2019], Internet <URL: https://tools.ietf.org/html/rfc8216>
[NPL 3] M. Takagi, H. Fujii, and A. Shimizu, "Optimized Spatial and Temporal Resolution based on Subjective Quality Estimation without Encoding" Proc. VCIP (Visual Communications and Image Processing), pp. 33-36, December 2014.
[NPL 4] T. Y. Huang, R. Johari, N. McKeown, M. Trunnell, and M. Watson, "A Buffer-Based Approach to Rate Adaptation: Evidence from a Large Video Streaming Service", ACM SIGCOMM, Volume 44 Issue 4, pp. 187-198, August 2014.

SUMMARY OF THE INVENTION

Technical Problem

However, the conventionally-proposed video coding system described earlier has the following two problems.

The first problem is that, in the conventional video coding system, even if the video coding system takes QoE into consideration, even a small difference in throughput results in a significant change in obtained QoE if only a small number of channels are available. The bit rate of each channel is generally set in stages from several hundred kbps to more than ten Mbps. For example, when an ultra-high definition video is included, the bit rate is set in stages from several hundred kbps to several ten Mbps. Therefore, when the throughput of the network used is even slightly less than a desired bit rate that can be received by a video-viewing terminal, the video-viewing terminal ends up selecting a bit rate that is lower by one stage than the desired bit rate. When there are a large number of video-viewing terminals which end up selecting such a bit rate, QoE of video-viewing users as a whole declines. Therefore, an appropriate bit rate with respect to the throughput of the used network must be set by the encoder to perform video distribution.

The second problem is that, in the conventional system, since a bit rate is determined in advance by the encoder to perform video distribution, the setting by the encoder is unable to follow the network throughput which varies significantly depending on a time slot of use and a network environment. For example, in a state where the throughput of the used network is uniformly low, pieces of video data with a high bit rate prepared by a video distribution server are never selected and only pieces of video data with a low bit rate are to be selected. Conversely, in a state where the throughput of the used network is uniformly high, pieces of video data with a low bit rate prepared by a video distribution server are never selected and only pieces of video data with a high bit rate are to be selected. Accordingly, QoE of video-viewing users as a whole declines and, due to creation of video data that is never used despite being generated, a server resource of the video distribution server ends up being wasted.

The present invention has been made in consideration of the points described above and an object thereof is to provide a technique which enables quality of experience of a video-viewing user to be improved while suppressing an increase in a load of simultaneous coding processing on an encoder.

Means for Solving the Problem

An aspect of the present invention is a coded data generation method of generating coded data of a plurality of bit rates in which an image is encoded, the coded data generation method including the steps of: acquiring an evaluated value at distribution destinations of the generated coded data when the coded data is reproduced; and changing the bit rate of the coded data to be generated based on a distribution of the acquired evaluated value in all channels.

In addition, an aspect of the present invention is a coded data generation apparatus which generates coded data of a plurality of bit rates in which an image is encoded, the coded data generation apparatus including: an evaluation acquiring unit which acquires an evaluated value at distribution destinations of the generated coded data when the coded data is reproduced; and a bit rate changing unit which changes the bit rate of the coded data to be generated based on a distribution of the acquired evaluated value in all channels.

Furthermore, an aspect of the present invention is a program for causing a computer to execute the coded data generation method described above.

Effects of the Invention

According to the present invention, quality of experience of a video-viewing user can be improved while suppressing an increase in a load of simultaneous coding processing on an encoder.

DESCRIPTION OF EMBODIMENTS

Hereinafter, embodiments of the present invention will be described.

As a premise, an objective of each of the embodiments to be described below is to distribute, among a limited parameter set (intended to mean a bit rate, a frame rate, a resolution, and the like which have a major impact on a subjective quality of a video. As far as only this paragraph is concerned, the limited parameter set will be referred to as a "bit rate"), a video at a bit rate suitable for as many users as possible. As a method of realizing this objective, a conceivable method involves adaptively assigning, in accordance with a change in an environment where moving image playback apparatuses being distribution destinations of the coded data are located, coded data at as many bit rates as possible with respect to a high-density environment and coded data at a smaller number of bit rates with respect to a low-density environment as compared to a high-density environment in accordance with a distribution of the environment. In order to realize this method, each embodiment to be described below performs control so as to increase coded data with a high bit rate when a percentage of moving image playback apparatuses having an environment (for example, communication quality and decoder performance) in which reception and playback can be performed at high subjective image quality in the whole is high and to increase coded data with a low bit rate when a percentage of moving image playback apparatuses having an environment in which reception and playback are performed at low subjective image quality in the whole is high.

First Embodiment

Hereinafter, a coded data generation method, a coded data generation apparatus, and a program according to a first embodiment of the present invention will be described with reference to the drawings.

[Configuration of Moving Image Playback System]

Hereinafter, a configuration of a moving image playback system 1 according to the first embodiment will be described.

Figure 1:
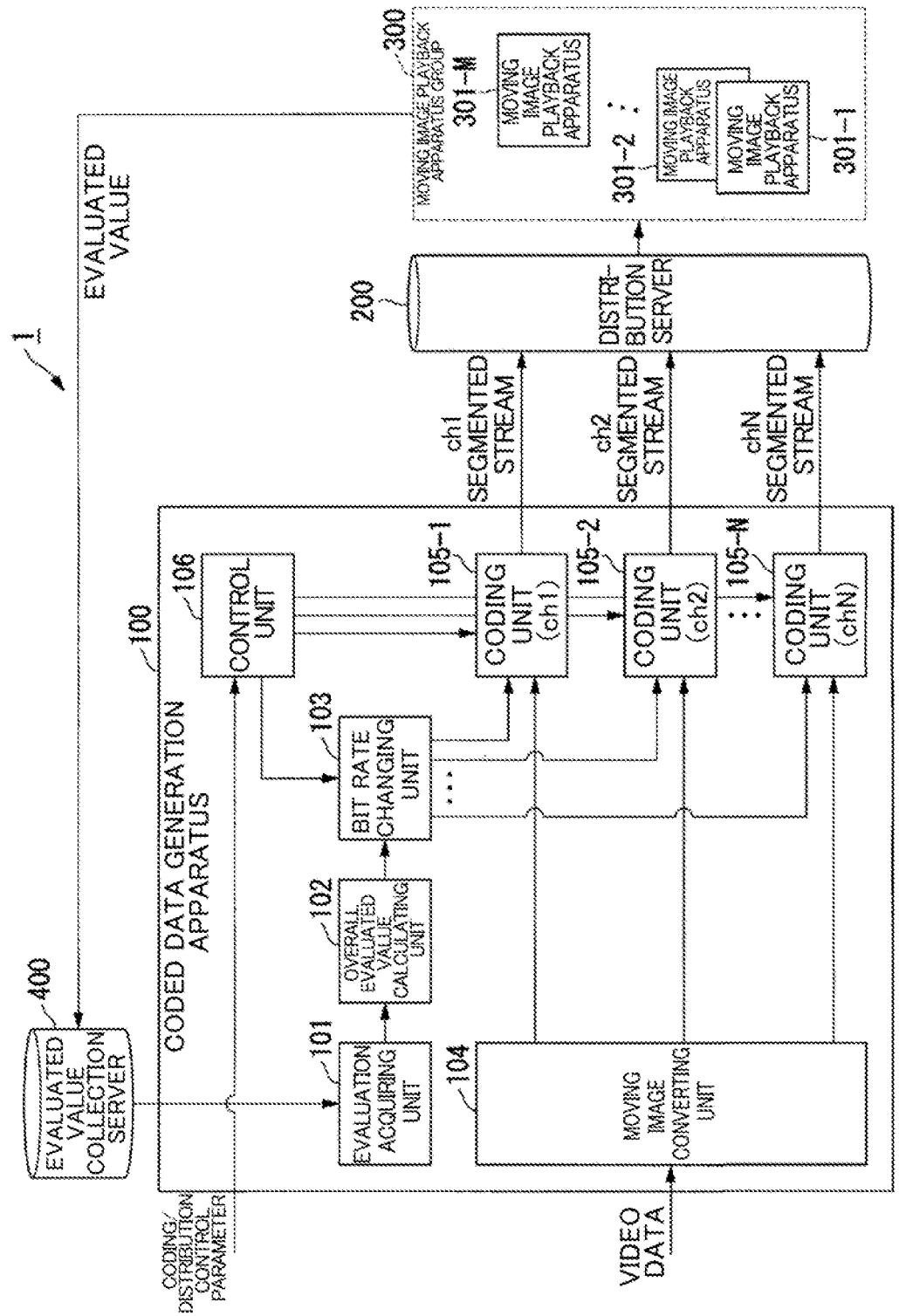
FIG. 1 is a system configuration diagram of a moving image playback system 1 according to a first embodiment of the present invention.

FIG. 1 is a system configuration diagram of the moving image playback system 1 according to the first embodiment of the present invention. As shown in FIG. 1, the moving image playback system 1 according to the present embodiment is configured to include a coded data generation apparatus 100, a distribution server 200, a moving image playback apparatus group 300, and an evaluated value collection server 400. The coded data generation apparatus 100, the distribution server 200, the moving image playback apparatus group 300, and the evaluated value collection server 400 are connected to each other by a network.

The moving image playback apparatus group 300 includes M-number (where M is an integer equal to or larger than 2) of moving image playback apparatuses (moving image playback apparatuses 301-1 to 301-M). Each of the moving image playback apparatuses 301-1 to 301-M acquires video data from the distribution server 200 and reproduces moving image data. Hereinafter, when the moving image playback apparatuses 301-1 to 301-M need not be described by distinguishing from one another, the moving image playback apparatuses 301-1 to 301-M will be simply referred to as the "moving image playback apparatus 301".

The coded data generation apparatus 100 is an apparatus that performs video distribution according to the ABR distribution system. The coded data generation apparatus 100 acquires video content data (hereinafter, referred to as "video data") which is a coding object from an external apparatus or the like. The coded data generation apparatus 100 encodes the acquired video data at each of a plurality of bit rates (a plurality of channels).

Specifically, the coded data generation apparatus 100 accepts input of a coding/distribution control parameter and video data. The coded data generation apparatus 100 converts a resolution of the input video data into each of a plurality of (two or more) resolutions based on the coding/distribution control parameter. When the resolution of the input video data is to be used as it is, the coded data generation apparatus 100 need not perform conversion processing of the resolution.

Next, with respect to each piece of video data of which the resolution has been converted, the coded data generation apparatus 100 performs coding at a bit rate corresponding to each resolution based on the input coding/distribution control parameter. In addition, the coded data generation apparatus 100 divides (hereinafter, referred to as "segments") the coded video data for every predetermined period based on the coding/distribution control parameter and sequentially outputs the segmented video data to the distribution server 200. Hereinafter, the segmented video data will be referred to as "segmented data".

Each moving image playback apparatus 301 receives each piece of segmented data encoded at a desired bit rate from the distribution server 200 and plays back a video. At the same time, the moving image playback apparatus group 300 transmits an evaluated value corresponding to the segmented data having been received and reproduced by each moving image playback apparatus 301 to the evaluated value collection server 400.

As shown in FIG. 1, the coded data generation apparatus 100 is configured to include an evaluation acquiring unit 101, an overall evaluated value calculating unit 102, a bit rate changing unit 103, a moving image converting unit 104, N-number (where N is an integer equal to or larger than 2) of coding units (coding units 105-1 to 105-N), and a control unit 106. In the following description, when the coding units 105-1 to 105-N need not be described by distinguishing from one another, the coding units 105-1 to 105-N will be simply referred to as the "coding unit 105". Each coding unit 105 performs coding (bit rate adjustment) of a channel associated with the coding unit 105 itself.

The evaluated value collection server 400 acquires and stores evaluated values transmitted from the moving image playback apparatus group 300. In addition, the evaluated value collection server 400 aggregates the acquired evaluated values and stores an aggregate result. For example, the evaluated value collection server 400 aggregates, for each moving image playback apparatus 301, respective evaluated values related to all pieces of segmented data received by each moving image playback apparatus 301 within a predetermined period, and stores an aggregate result. The evaluated value collection server 400 is configured to include a storage medium such as a RAM (Random Access Memory), a flash memory, an EEPROM (Electrically Erasable Programmable Read Only Memory), or an HDD (Hard Disk Drive), or any combination of these storage media.

The evaluation acquiring unit 101 acquires an evaluated value which has been created by aggregating, for each moving image playback apparatus 301, segmented data received by each moving image playback apparatus 301 within a predetermined period and which is stored in the evaluated value collection server 400. The evaluation acquiring unit 101 outputs the acquired evaluated value to the overall evaluated value calculating unit 102.

It should be noted that a configuration may be adopted in which the aggregation of evaluated values by the evaluated value collection server 400 described above is performed by the evaluation acquiring unit 101 instead of the evaluated value collection server 400. In other words, the evaluation acquiring unit 101 may acquire, from the evaluated value collection server 400, respective evaluated values related to all pieces of segmented data received by each moving image playback apparatus 301 within a predetermined period. In addition, the evaluation acquiring unit 101 may aggregate the acquired evaluated values for each moving image playback apparatus 301.

In the present embodiment, an evaluated value is a value (hereinafter, also referred to as a "QoE value") which indicates a quality of experience (a subjective quality) of a video-viewing user that can be calculated based on a resolution, a frame rate, a bit rate, and the like which are determined for each channel. In a second embodiment to be described later, an estimated throughput that is calculated based on a required reception time and a file size of a segmented file is used as an evaluated value instead of a QoE value.

The overall evaluated value calculating unit 102 acquires an evaluated value (QoE value) output from the evaluation acquiring unit 101. Based on the acquired evaluated value, the overall evaluated value calculating unit 102 calculates a distribution of evaluated values in all channels and an overall average evaluated value that indicates an average value of evaluated values in all of the moving image playback apparatuses 301 within a predetermined period. The overall evaluated value calculating unit 102 calculates the ratio and the overall average evaluated value in accordance with an algorithm to be described later. The overall evaluated value calculating unit 102 outputs a calculation result to the bit rate changing unit 103.

The bit rate changing unit 103 acquires the calculation result described above which is output from the overall evaluated value calculating unit 102. Based on the acquired calculation result, the bit rate changing unit 103 determines each new bit rate to be set with respect to each coding unit 105. At this point, the bit rate changing unit 103 determines each new bit rate so that an overall average evaluated value in a case where the new bit rate is set exceeds the overall average evaluated value at the current moment. The bit rate changing unit 103 determines the new bit rate in accordance with an algorithm to be described later. The bit rate changing unit 103 updates a bit rate set to each coding unit 105 with the determined new bit rate.

When it is expected that the overall average evaluated value at the current moment will not be exceeded even if the bit rate is changed, the bit rate changing unit 103 does not change the bit rate of the coding unit 105. It should be noted that the bit rates set to all coding units 105 (channels) need not always be updated to new bit rates at the same time, and only the bit rates set to a part of the coding units 105 may be updated to new bit rates. In other words, there may be a mixture of coding units 105 (channels) of which bit rates are to be updated and coding units 105 (channels) of which bit rates are not to be updated.

It should be noted that the bit rate changing unit 103 may be configured to change both a bit rate and a frame rate instead of just the bit rate. Alternatively, the bit rate changing unit 103 may be configured to change the frame rate instead of changing the bit rate as described above.

The moving image converting unit 104 accepts input of video data from an external apparatus or the like. The moving image converting unit 104 converts the input video data into a plurality (N-number) of pieces of video data of which resolutions differ from each other in accordance with the coding/distribution control parameter so that coding is performed by each coding unit 105 in a stable manner.

In the present embodiment, as an example, it is assumed that the moving image converting unit 104 converts video data into pieces of video data of five different resolutions so that coding is performed at five types (in other words, N=5) of bit rates by each coding unit 105. For example, the moving image converting unit 104 converts video data into pieces of video data of the five resolutions of 2160p, 1080p, 720p, 480p, and 180p.

The moving image converting unit 104 outputs video data with a resolution of 2160p to the coding unit 105-1. In a similar manner, the moving image converting unit 104 respectively outputs the pieces of video data with resolutions of 1080p, 720p, 480p, and 180p to the coding units 105-2 to 105-5. There may be cases where the moving image converting unit 104 does not convert the resolution of video data. In other words, there may be cases where the moving image converting unit 104 outputs the resolution of the input video data to the coding unit 105 as it is. In addition, the moving image converting unit 104 may be configured to convert a frame rate in addition to converting a resolution. Furthermore, there may be cases where the moving image converting unit 104 outputs video data with a same resolution to a plurality of coding units 105.

The coding unit 105 acquires video data output from the moving image converting unit 104. At an initial time point, the coding unit 105 encodes the acquired video data at a bit rate of an initial value set in advance based on the coding/distribution control parameter. The coding unit 105 segments the coded video data and generates a segmented file. The coding unit 105 outputs the generated segmented file to the distribution server 200. It should be noted that the initial value of the bit rate that is set as the coding/distribution control parameter is set in advance based on at least one of communication band information indicating a communication band in the moving image playback apparatus group 300 being a distribution destination of video data and predetermined distribution conditions.

Specifically, at an initial time point, based on a bit rate (for example, 30 Mbps) of an initial value set based on the coding/distribution parameter and video data output from the moving image converting unit 104 of which a resolution is 2160p, the coding unit 105-1 encodes the video data. In a similar manner, at an initial time point, based on bit rates (for example, 10 Mbps, 5 Mbps, 800 kbps, and 200 kbps) of initial values set based on the coding/distribution parameter and pieces of video data output from the moving image converting unit 104 of which resolutions are 1080p, 720p, 480p, and 180p, the coding units 105-2 to 105-N respectively encode the pieces of video data.

When a bit rate is updated to a new bit rate by the bit rate changing unit 103, the coding unit 105 encodes the video data at the updated bit rate. The coding unit 105 segments the coded video data and generates a segmented file. The coding unit 105 outputs the generated segmented file to the distribution server 200.

Specifically, based on the updated bit rate (for example, 25 Mbps) and video data output from the moving image converting unit 104 of which a resolution is 2160p, the coding unit 105-1 encodes the video data. In a similar manner, based on the updated bit rates (for example, 15 Mbps, 2 Mbps, 1 Mbps, and 500 kbps) and pieces of video data output from the moving image converting unit 104 of which resolutions are 1080p, 720p, 480p, and 180p, the coding units 105-2 to 105-5 respectively encode the pieces of video data.

The control unit 106 controls operations of the respective functional units included in the coded data generation apparatus 100. For example, the control unit 106 is configured to include a processor such as a CPU (Central Processing Unit).

[Operations of Evaluation Acquiring Unit]

Hereinafter, an example of operations of the evaluation acquiring unit 101 will be described.

Figure 2:
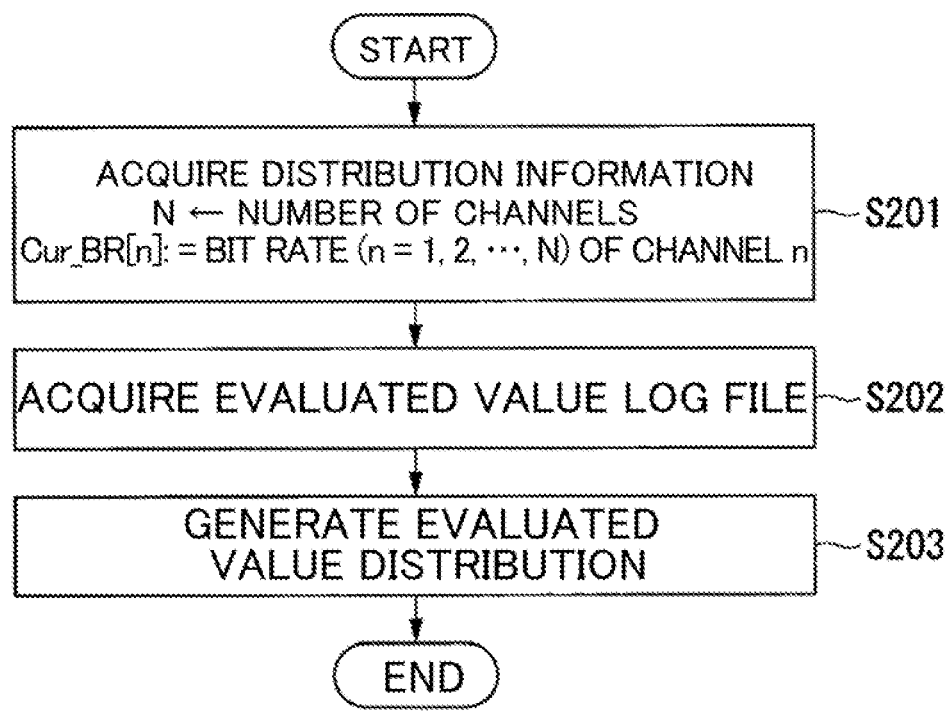
FIG. 2 is a flow chart showing operations of an evaluation acquiring unit 101 according to the first embodiment of the present invention.

FIG. 2 is a flow chart showing operations of the evaluation acquiring unit 101 according to the first embodiment of the present invention.

In the following description, N denotes a variable representing a total number of channels (coding units 105) to be used for video distribution according to the ABR distribution system. In addition, Cur_BR[n] denotes a variable representing a bit rate at the current moment set in a channel n (n=1, 2, . . . , N) of which a channel number for identifying each channel indicates an n-th channel.

In this case, it is assumed that the smaller the numerical value of the channel number of a channel, the lower the resolution and the bit rate of the channel (hereinafter, referred to as a "low-order channel"). Conversely, it is assumed that the larger the numerical value of the channel number of a channel, the higher the resolution and the bit rate of the channel (hereinafter, referred to as a "high-order channel"). In addition, in FIG. 2, a leftward arrow "←" represents a substitution of a value from a right side to a left side.

The evaluation acquiring unit 101 acquires distribution information indicating a total number of channels (coding units 105) which are set in the coded data generation apparatus 100 and a bit rate set to each channel at the current moment from, for example, the control unit 106. The evaluation acquiring unit 101 respectively sets the total number of channels and the bit rate of the channels based on the acquired distribution information to N and Cur_BR[n] that are the variables described earlier (step S201).

Next, the evaluation acquiring unit 101 acquires an evaluated value log file which is stored in the evaluated value collection server 400 and which includes information indicating an evaluated value obtained by aggregating evaluated values within a predetermined period (step S202). In this case, it is assumed that the evaluated value log file includes information indicating a file name, a reception time point, a required reception time, a file size, an evaluated value (QoE value), and the like of each segmented file received by each moving image playback apparatus 301.

Next, based on the acquired evaluated value log file, the evaluation acquiring unit 101 generates an evaluated value distribution to be described below (step S203). This concludes the operations of the evaluation acquiring unit 101 indicated by the flow chart shown in FIG. 2.

Hereinafter, the evaluated value distribution generated by the evaluation acquiring unit 101 will be described.

Figure 3:
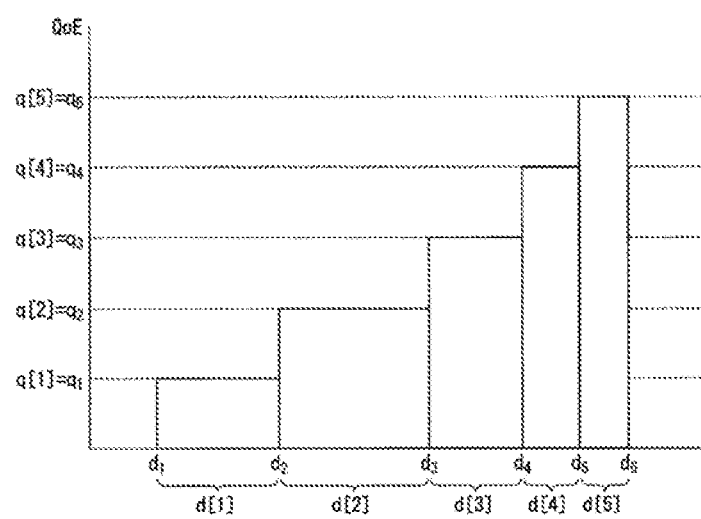
FIG. 3 is a schematic view showing an example of an evaluated value distribution according to the first embodiment of the present invention.

FIG. 3 is a schematic view showing an example of the evaluated value distribution according to the first embodiment of the present invention.

FIG. 3 shows an example of the evaluated value distribution when the total number of channels is five (in other words, N=5). An ordinate of a graph shown in FIG. 3 represents evaluated values, and evaluated values of the channels 1 to 5 are to be respectively represented as q[1] to q[5]. In this case, q[n] is a positive value indicating a QoE value and represented by a value within a range of 1 to 5. In addition, an abscissa of the graph shown in FIG. 3 represents the number of evaluated value log files including each evaluated value, and the number of evaluated value log files of which the evaluated value is q[n] is to be represented as d[n].

For example, when the five moving image playback apparatuses 301 (the moving image playback apparatuses 301-1 to 301-5) respectively receive and reproduce 20 segmented files and respectively generate evaluated value log files related to the segmented files, the total number of d[n] is 100. When sufficient throughput for receiving the segmented files of a channel n cannot be obtained, each moving image playback apparatus 301 receives segmented files of a channel [n−1] which is a next lower order channel. This means that a maximum of N-number of (a number equivalent to the number of channels) QoE values are present in an evaluated value log file. Accordingly, a 5-stage stepwise distribution such as that shown in FIG. 3 is to be obtained.

Based on the evaluated value distribution generated by the evaluation acquiring unit 101, the overall evaluated value calculating unit 102 calculates an overall evaluated value Cur_E_QoE. The overall evaluated value Cur_E_QoE is an average evaluated value among all moving image playback apparatuses 301 (the moving image playback apparatuses 301-1 to 301-5) in video distribution at the current moment. As shown in Expression (1) below, the overall evaluated value Cur_E_QoE is calculated based on the evaluated value (QoE value) of each channel and the number of evaluated value log files which include the evaluated value. In this case, D represents the total number of evaluated value log files.

$$\mathrm{Cur\_E\_QoE} = 1/D \times \Sigma\_\{n=1\}^\{N\}(q[n] \times d[n])$$

$$D = \Sigma\_\{n=1\}^\{N\}(d[n]) \qquad (1)$$

[Operations of Bit Rate Changing Unit]

Hereinafter, an example of operations of the bit rate changing unit 103 will be described.

Figure 4:
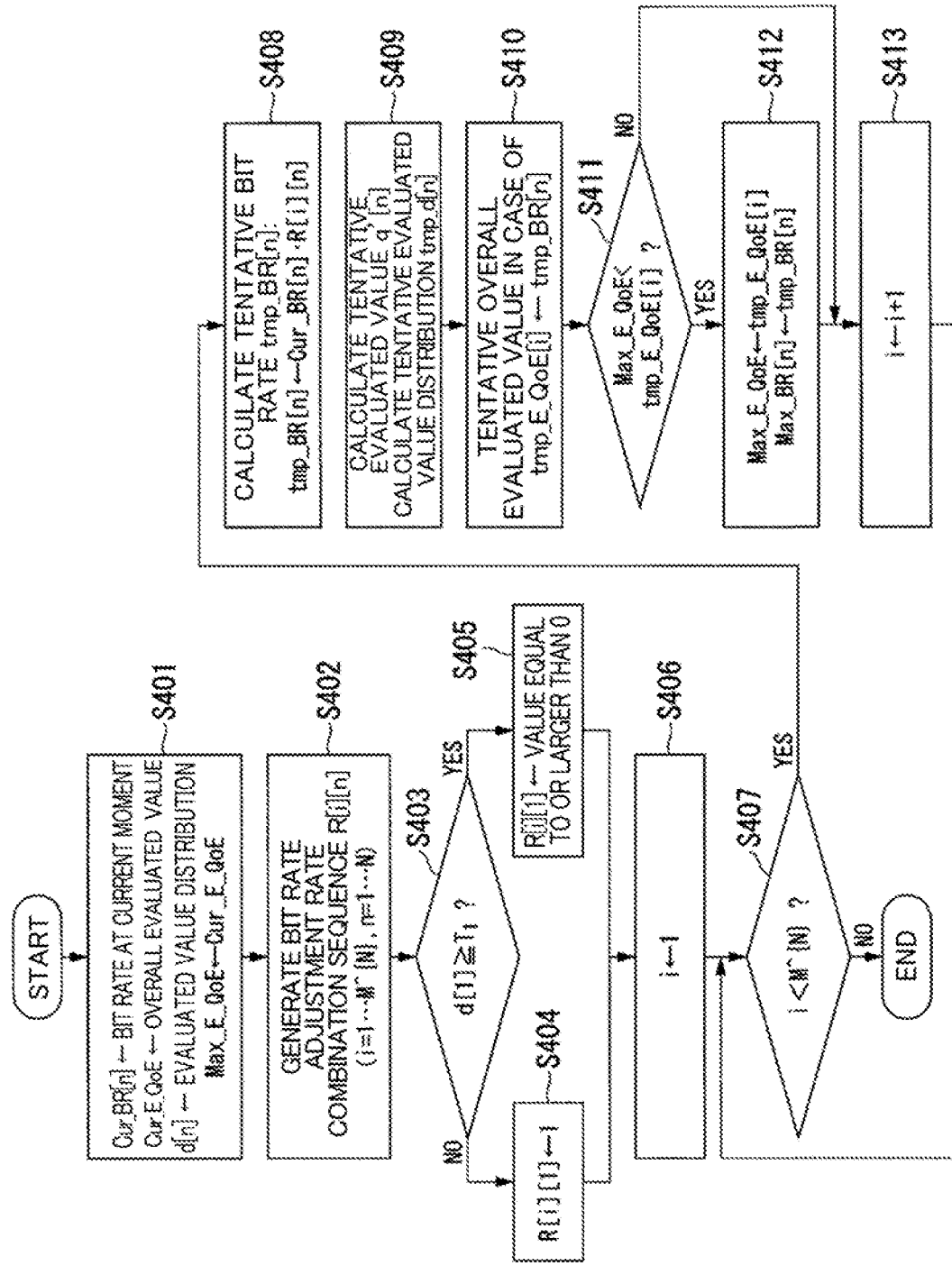
FIG. 4 is a flow chart showing operations of a bit rate changing unit 103 according to the first embodiment of the present invention.

FIG. 4 is a flow chart showing operations of the bit rate changing unit 103 according to the first embodiment of the present invention. In FIG. 4, a leftward arrow "←" represents a substitution of a value from a right side to a left side.

First, the bit rate changing unit 103 acquires distribution information indicating a total number of channels (coding units 105) which are set in the coded data generation apparatus 100 and a bit rate set to each channel at the current moment from, for example, the control unit 106. The bit rate changing unit 103 respectively sets information indicating the total number of channels and the bit rate of the channels based on the acquired distribution information to N and Cur_BR[n] that are the variables described above.

In addition, the bit rate changing unit 103 respectively sets the overall evaluated value and the evaluated value distribution calculated by the overall evaluated value calculating unit 102 to Cur_E_QoE and d[n] which are the variables described above. Furthermore, the bit rate changing unit 103 initializes a value of Max_E_QoE being a variable indicating an overall evaluated value that is maximized when the bit rate is changed by subsequent processing by adopting the value of Max_E_QoE as the value of Cur_E_QoE (step S401).

Next, the bit rate changing unit 103 generates R[i] [n] that represents a sequence indicating a combination of bit rate adjustment rates for attempting an adjustment of a bit rate (hereinafter, referred to as a "bit rate adjustment rate combination sequence") (step S402). In this case, R[i] [n] is a coefficient sequence for increasing or decreasing a bit rate of each channel set to Cur_BR[n] by a multiplication factor of X (0≤X, a same bit rate when X=1).

For example, assuming that there are M-number of bit rate adjustment rates of each channel, when adjustments of bit rates are respectively performed according to the M-number of bit rate adjustment rates for all (N-number of) channels, there are M^{N}-number of combinations of the bit rate adjustment rates. For example, when M=2 ({m1, m2})–number of adjustments of bit rates are to be performed with respect to N=3 ({c1, c2, c3}), there are eight combinations of the bit rate adjustment rates as shown below. In this case, c1, c2, and c3 represent the respective channels and m1 and m2 represent respective bit rate adjustment rates.

{c1,c2,c3}={m1,m1,m1},

{m1,m1,m2},

{m1,m2,m1},

{m1,m2,m2},

{m2,m1,m1},

{m2,m1,m2},

{m2,m2,m1},

{m2,m2,m2},

It is assumed that all of the combinations (in the example described above, eight combinations) of bit rate adjustment rates are set to the bit rate adjustment rate combination sequence R[i] [n] and that an index i (i=1, 2, . . . , M^{N}) is assigned to every one of the combinations. In addition, an adjustment amount of a bit rate can be calculated based on, for example, the bit rate adjustment rate described above and a bit rate prior to the change. Alternatively, an adjustment amount of a bit rate may be, for example, a predetermined value or the like expressed in units of bit rates.

When generating the bit rate adjustment rate combination sequence R[i] [n], the bit rate changing unit 103 respectively determines channels to be objects of an adjustment of a bit rate and channels not to be objects of an adjustment of a bit rate based on a value of the evaluated value distribution d[n].

The bit rate changing unit 103 may be configured not to change a bit rate with respect to a highest-order channel and a lowest-order channel. For example, changing the bit rate of the lowest-order channel or changing the bit rate of the highest-order channel results in changing a lowest video quality or a highest video quality in the video distribution service. Generally, since changing such bit rates often affect a design of the video distribution service and the like, such bit rates are desirably left unchanged.

When a ratio of the evaluated value distribution d[1] is equal to or higher than $T_1$ denoting a predetermined ratio (step S403: Y), the bit rate changing unit 103 also determines a bit rate of the lowest-order channel as a channel to be an object of bit rate adjustment and changes the bit rate of the lowest-order channel so as to assume a lower value (step S405). This is because it is surmised that the network is in an extremely poor state and that many users are unable to receive and play back even a video with a lowest quality. Changing the bit rate of the lowest-order channel enables video distribution to be performed while guaranteeing a lowest quality.

On the other hand, when a ratio of the evaluated value distribution d[1] is lower than $T_1$ (step S403: N), the bit rate changing unit 103 determines a bit rate of the lowest-order channel as a channel not to be an object of bit rate adjustment and does not change the bit rate of the lowest-order channel (step S404).

For example, let us assume that, when N=5, the bit rate changing unit 103 changes bit rates so that the bit rate of the lowest-order channel and the bit rate of the highest-order channel are left unchanged but bit rates of other channels are respectively changed so as to be multiplied by 2.0. In this case, the bit rate adjustment rate combination sequence R[i] [n] is represented by Expression (2) below.

$$R[i][n]=\{1.0,2.0,2.0,2.0,1.0\} \quad (2)$$

Next, based on the generated R[i] [n], the bit rate changing unit 103 respectively iteratively performs processing of steps S408 to S413 described below with respect to all combinations of bit rate adjustment rates described earlier that are set to each channel (step S407).

(In Case of i<M^{N} (Step S407: Y))

The bit rate changing unit 103 calculates tmp_BR[n] that is a variable representing a tentative bit rate in an i-th attempt according to Expression (3) below (step S408).

$$tmp\_BR[n]=Cur\_BR[n] \cdot R[i][n] \quad (3)$$

In this case, a symbol "·" represents a symbol of an operation for multiplying elements with a same index in a sequence. For example, when Cur_BR[n] and R[i] [n] are as follows, tmp_BR[n] is calculated as follows.

Cur_BR[n]={30000,15000,1000,500,100},

R[i][n]={1.0,0.9,0.8,0.8,1.0} tmp_BR[n]={30000,13500,800,400,100}

Next, when calculating an overall evaluated value in the case of tmp_BR[n], the bit rate changing unit 103 first calculates a tentative evaluated value distribution tmp_d[n] in the case of tmp_BR[n] based on the evaluated value distribution d[n] obtained at the current moment with respect to Cur_BR[n] (step S409).

Figure 5:
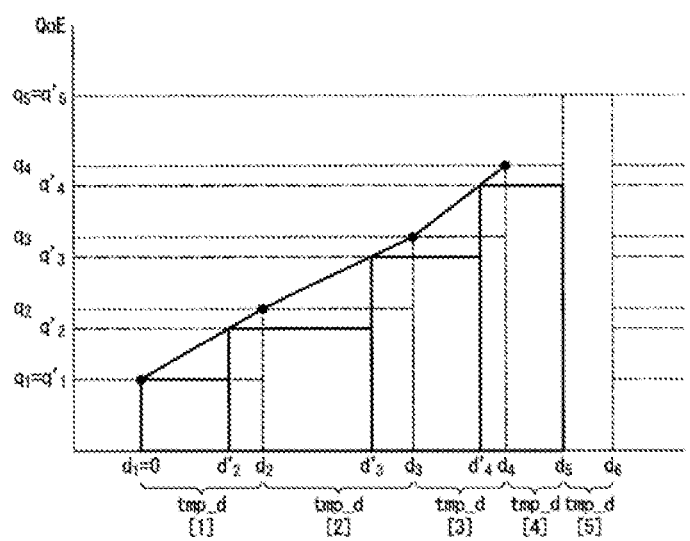
FIG. 5 is a diagram for describing processing for obtaining a tentative evaluated value distribution according to the first embodiment of the present invention.

FIG. 5 is a diagram for describing processing for obtaining a tentative evaluated value distribution according to the first embodiment of the present invention. FIG. 5 shows a schematic view of tmp_d[n] with respect to d[n]. Hereinafter, coordinate values when respectively expanding evaluated value log files represented by d[n] to coordinates on an abscissa are to be represented by $d_1$ to $d_n$. In addition, coordinate values when respectively expanding evaluated value log files represented by tmp_d[n] to coordinates on an abscissa are to be represented by to $d'_1$ to $d'_{n+1}$. In this case, it is calculated that $d_1=0$, $d_n=\Sigma\_\{i=1\}^\{n\} (d[i])$ and $d'_1=0$, $d'_n=\Sigma\{i=1\}^\{n\} (tmP\_d[i])$.

When calculating the tentative evaluated value distribution tmp_d[n], the bit rate changing unit 103 calculates a tentative evaluated value q' [n] of each channel in the case of tmp_BR[n]. In the example shown in FIG. 5, since tmp_BR[1]=Cur_BR[1] and tmp_BR[5]=Cur_BR[5], it is calculated that q[1]=q' [1] and q[5]=q' [5]. In this case, an evaluation model similar to when calculating q[n] described earlier is used to calculate q' [n].

In this case, the evaluated value distribution tmp_d[n] in the case of q' [n] is calculated according to Expression (4) below. In this case, D represents the total number of evaluated value log files ($\Sigma\_\{n=1\}^\{N\}(tmp\_d[n])$).

(When $n<N$)

$tmp\_d[n]=d'n+1-d'_n$ (When $n=N$)

$$tmp\_d[n]=D-d'_n \quad (4)$$

$d'_n$ is calculated according to Expression (5) below.

(When $1<n \leq N$)

$d'n=(q'_n-q_{n-1}) \times (d_n-d_{n-1})/(q_n-q_{n-1})+d_{n-1}$ (When $n=1$)

$$d'_n=d_n \quad (5)$$

Expression (4) and Expression (5) signify that the bit rate changing unit 103 calculates the tentative evaluated value distribution tmp_d[n] in the case of q' [n] by linear interpolation from adjacent values using q[n] and d[n]. However, a calculation method of tmp_d[n] is not limited to a method of linear interpolation using adjacent values as described above and, for example, a calculation method of deriving an interpolation function using all values of q[n] and d[n] may be used instead.

Next, the bit rate changing unit 103 calculates a tentative overall evaluated value tmp_E_QoE[i] with respect to the tentative evaluated value q' [n] and the tentative evaluated value distribution tmp_d[n] (step S410). tmp_E_QoE[n] is calculated according to Expression (6) below.

$tmp\_E\_QoE[i]=1/D \times \Sigma\_\{n=1\}^\{N\}(q'[n] \times tmp\_d[n])$ $$D=\Sigma\_\{n=1\}^\{N\}(tmp\_d[n]) \quad (6)$$

When the value of tmp_E_QoE[i] exceeds Max_E_QoE that is a highest overall evaluated value at the current moment (step S411: Y), the bit rate changing unit 103 updates a value of Max_E_E with the value of tmp_E_QoE [i] and, at the same time, saves tmp_BR[n] as Max BR[n] that indicates a bit rate at which Max_E_QoE is obtained (step S412). In addition, the bit rate changing unit 103 returns to step S407 and proceeds to processing for calculating an overall evaluated value with respect to a next adjustment pattern of bit rates (a combination of bit rate adjustment rates) (step S413).

On the other hand, when the value of tmp_E_QoE[i] is equal to or lower than Max_E_QoE that is a highest overall evaluated value at the current moment (step S411: N), the bit rate changing unit 103 does not update the value of Max_E_QoE and the value of Max BR[n]. In addition, the bit rate changing unit 103 returns to step S407 and proceeds to processing for calculating an overall evaluated value with respect to a next adjustment pattern of bit rates (a combination of bit rate adjustment rates) (step S413).

(In Case of i=M^{N} (Step S407: N))

The bit rate changing unit 103 outputs the value of Max_E_QoE maximized during the iterative processing of steps S407 to S413 and a value of Max BR[n] in this case. This concludes the operations of the bit rate changing unit 103 indicated by the flow chart shown in FIG. 4.

The coding units 105-1 to 105-N respectively set Max BR[n] output from the bit rate changing unit 103 as a new bit rate. The coding unit 105 performs coding using Max BR[n] that represents a new bit rate from a frame position being the beginning of a next segment.

Hereinafter, the change in a bit rate described earlier will be described using specific examples.

In this case, it is assumed that the evaluated value q[n], the evaluated value distribution d[n], and the total number of evaluated value log files D are, respectively, values as shown below.

$q[n] = \{1.0, 2.0, 3.0, 4.0, 5.0\}$, $d[n] = \{10, 40, 49, 1, 0\}$ (in other words, $d_n = \{0, 10, 50, 99, 100\}$)

$D = 100$

In this case, the overall evaluated value Cur_E_QoE is calculated as follows.

$Cur\_E\_QoE = 2.41$

For example, the tentative evaluated value distribution tmp_d [n] when changed to a bit rate so that q' [n] satisfies the following as shown below according to $d'_2$ to $d'_5$ below.

$$q'[n] = \{1.0, 1.9, 2.9, 3.5, 5.0\}$$

$d'_2 =$
$(q'_2 - q_1) \times (d_2 - d_1)/(q_2 - q_1) + d_1 = (1.9 - 1.0) \times (10 - 0)/(2 - 1) + 0 = 9$ $d'_3 = (q'_3 - q_2) \times (d_3 - d_2)/(q_3 - q_2) + d_2 =$
$(2.9 - 2.0) \times (50 - 10)/(3 - 2) + 10 = 46$ $d'_4 = (q'_4 - q_3) \times (d_4 - d_3)/(q_4 - q_3) + d_3 =$
$(3.5 - 3.0) \times (99 - 50)/(4 - 3) + 50 = 74.5$ $d'_5 = (q'_5 - q_4) \times (d_5 - d_4)/(q_5 - q_4) + d_4 =$
$(5.0 - 4.0) \times (100 - 99)/(5 - 4) + 99 = 100$ $tmp\_d[1] = d'_2 - d'_1 = 9 - 0 = 9$ $tmp\_d[2] = d'_3 - d'_2 = 46 - 9 = 35$ $tmp\_d[3] = d'_4 - d'_3 = 74.5 - 46 = 38.5$ $tmp\_d[4] = d'_5 - d'_4 = 100 - 74.5 = 25.5$ $tmp\_d[5] = D - d'_5 = 100 - 100 = 0$ In addition, the overall evaluated value tmp_E_QoE is to be calculated according to Expression (7) below as follows.

$$1/D \times E\{n=1\}^{\{N\}}(q'[n] \times tmp\_d[n]) = 2.512 \qquad (7)$$

In this manner, in the example described above, an overall evaluated value tmp_E_QoE (2.512) that exceeds the value (2.41) of the overall evaluated value Cur_E_QoE at the current moment is obtained.

The calculation result described above means that, when a ratio of cases where an evaluated value of a high-order channel (in other words, a channel with a high resolution and a high bit rate) is low, by changing the bit rates of respective channels including the high-order channel to lower bit rates, the moving image playback apparatus 301 originally configured to receive a next lower-order channel becomes capable of selecting a channel with a higher bit rate than the next lower-order channel. Accordingly, an overall average value of the QoE values becomes higher than an original overall average value.

As described above, the coded data generation apparatus 100 according to the first embodiment iteratively performs similar bit rate adjustment M^{N}-number of times at a maximum and specifies a value of a maximum overall evaluated value Max_E_QoE among the M^{N}-number of iterations. In addition, the coded data generation apparatus 100 sets a new bit rate with respect to each coding unit 105 based on a bit rate sequence Max BR[n] in a case where the overall evaluated value Max_E_QoE is maximized. By adopting the configuration described above, the coded data generation apparatus 100 is capable of increasing an overall average of QoE values. Accordingly, the coded data generation apparatus 100 can improve quality of experience (subjective quality) of a video-viewing user while suppressing an increase in a load of simultaneous coding processing on an encoder.

Second Embodiment

Hereinafter, a second embodiment of the present invention will be described with reference to the drawings.

A difference between a configuration of the moving image playback system 1 according to the second embodiment to be described below and the configuration of the moving image playback system 1 according to the first embodiment described earlier is that, among components of the coded data generation apparatus 100, the evaluation acquiring unit 101, the overall evaluated value calculating unit 102, and the bit rate changing unit 103 according to the first embodiment have been replaced with an evaluation acquiring unit 101*a*, an overall evaluated value calculating unit 102*a*, and a bit rate changing unit 103*a* to be respectively described below. Hereinafter, a description will be given with a focus on the differences described above.

Instead of using an evaluated value that is determined for each channel as in the first embodiment described earlier, the evaluation acquiring unit 101*a* uses an estimated throughput when a segmented file is received in each channel as an evaluated value. The evaluation acquiring unit 101*a* creates an evaluated value distribution D_t[n] using the estimated throughput.

Hereinafter, a creation method of an evaluated value distribution using an estimated throughput will be described.

First, when acquiring evaluated value log files, the evaluation acquiring unit 101*a* calculates an estimated throughput Th[j] according to Expression (8) below based on a required reception time t_j and a file size s_j ($1 \leq j < Nt$, where Nt denotes the number of segmented files) of segmented files included in each evaluated value log file.

$$Th[j] = \alpha \times (s\_j / t\_j) \quad (8)$$

In this case, α denotes a scaling coefficient that is a positive constant. Expression (8) presented above means that a value obtained by multiplying a throughput when a segmented files is received by a constant value (in other words, a value of α) is to be used as the estimated throughput Th[j].

Next, the evaluation acquiring unit 101*a* calculates a QoE value q_t[j] on the assumption that the estimated throughput Th[j] is a bit rate when the segmented file is encoded. It should be noted that a method similar to that used in the first embodiment described earlier can be used to calculate the QoE value. In this case, a total number of elements of the QoE value q_t[j] is Dt.

Hereinafter, the evaluated value distribution d_t[n] generated by the evaluation acquiring unit 101*a* will be described.

Figure 6:
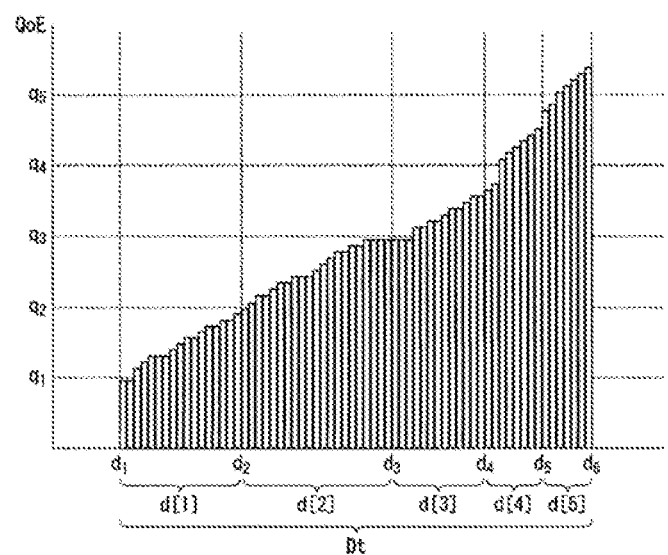
FIG. 6 is a schematic view showing an example of an evaluated value distribution according to a second embodiment of the present invention.

FIG. 6 is a schematic view showing an example of the evaluated value distribution according to the second embodiment of the present invention.

Unlike the evaluated value distribution according to the first embodiment shown in FIG. 3, in the evaluated value distribution d_t[n] according to the second embodiment, each bar in a bar graph shown in FIG. 6 represents an evaluated value (QoE value) based on an estimated throughput calculated from a single segmented file. According to the second embodiment, D_t-number of evaluated values which is larger than the number of evaluated value used in the first embodiment described earlier are to be used. As a result, according to the second embodiment, a finer evaluated value distribution than the first embodiment described earlier can be obtained.

Based on the evaluated value distribution d_t[n] generated by the evaluation acquiring unit 101*a*, the overall evaluated value calculating unit 102*a* calculates an overall evaluated value Cur_E_QoE. The overall evaluated value Cur_E_QoE is an average evaluated value among all moving image playback apparatuses 301 (the moving image playback apparatuses 301-1 to 301-5) in video distribution at the current moment. As shown in Expression (9) below, the overall evaluated value Cur_E_QoE is calculated based on the evaluated value of each channel and the number of evaluated value log files which include the evaluated value. In this case, D_t represents the total number of evaluated value log files.

$$Cur\_E\_QoE = 1/D\_t \times \Sigma\_\{n=1\}^\{N\}(q[n] \times d\_t[n])$$

$$D\_t = \Sigma\_\{n=1\}^\{N\}(d\_t[n]) \quad (9)$$

In this case, q[n] denotes an evaluated value at a bit rate of each channel n, and d_t[n] is defined as follows.

(When $n=1$)

the number of q_t[j] satisfying $q\_t[j] \leq q[n]$ (When $n=N$)

the number of q_t[j] satisfying $q[n] \leq q\_t[j]$ (Otherwise)

the number of q_t[j] satisfying $q[n] \leq q\_t[j] < q[n+1]$

[Operations of bit rate changing unit] Hereinafter, an example of operations of the bit rate changing unit 103*a* will be described.

Figure 7:
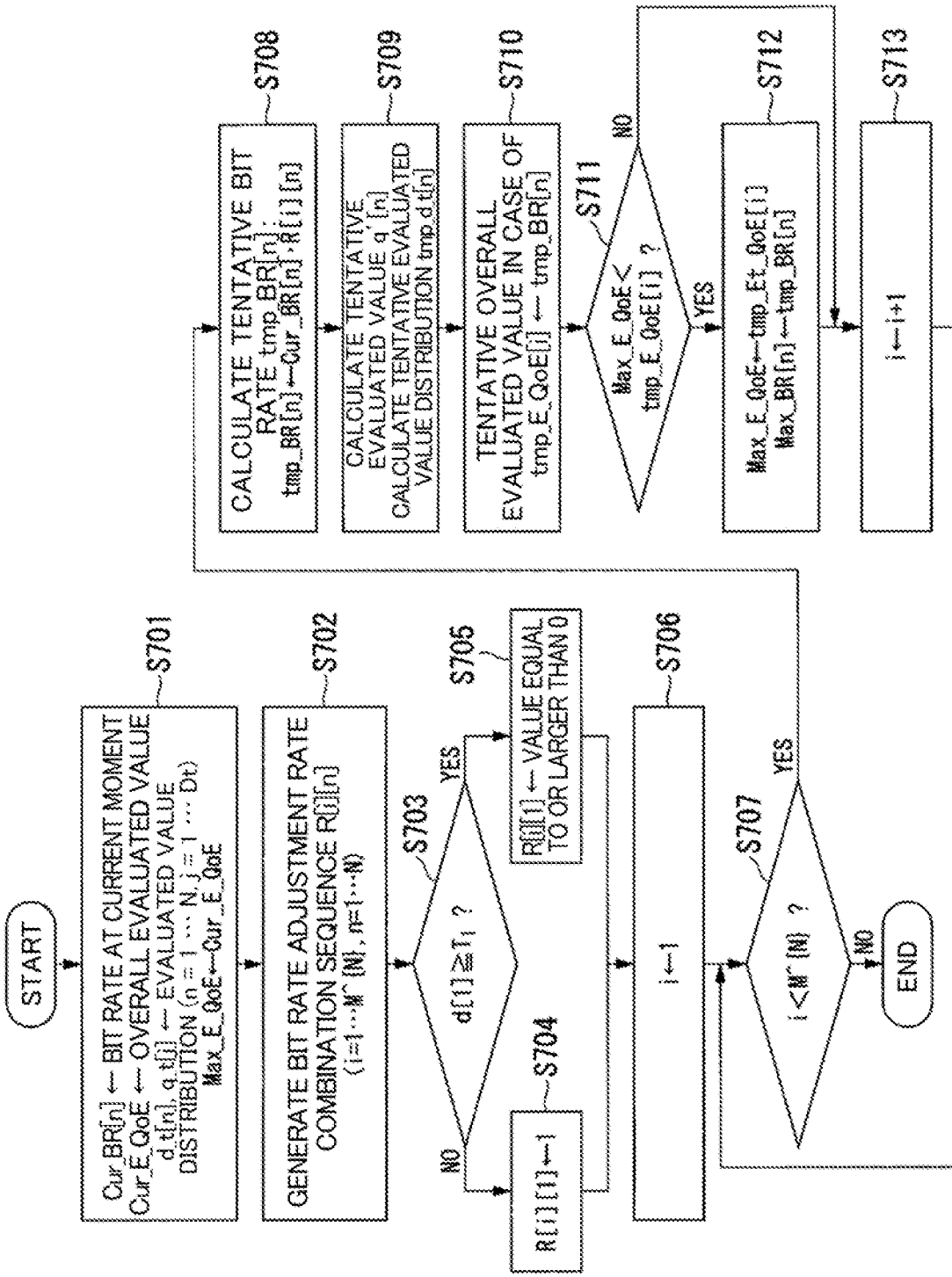
FIG. 7 is a flow chart showing operations of a bit rate changing unit 103a according to the second embodiment of the present invention.

FIG. 7 is a flow chart showing operations of the bit rate changing unit 103*a* according to the second embodiment of the present invention. In FIG. 7, a leftward arrow "←" represents a substitution of a value from a right side to a left side.

As shown in FIG. 7, while an overall flow of the operations of the bit rate changing unit 103*a* is similar to the operations of the bit rate changing unit 103 according to the first embodiment described earlier and shown in FIG. 4, values to be used differ. The following description will focus on differences from the first embodiment.

The bit rate changing unit 103*a* calculates a tentative evaluated value distribution tmp_d_t[n] in the case of q' [n] according to Expression (10) below.

(When $n=1$)

the number of q_t[j] satisfying tmp_d_t[n]: $q\_t[j] \leq q'\leq[n]$ (When $n=N$)

the number of q_t[j] satisfying tmp_d_t[n]: $q'[n] \leq q\_t[j]$ (Otherwise)

the number of q_t[j] satisfying tmp_d_t[n]: $q'[n] \leq q\_t[j] < q'[n+1]$ (10)

Expression (10) signifies that the bit rate changing unit 103*a* calculates the tentative evaluated value distribution tmp_d_t[n] in the case of q' [n] by counting the number of elements equal to or lower than q' [n+1] based on the original evaluated value distribution made up of D_t-number of evaluated values. According to the second embodiment, since a large number of pieces of data based on information indicating actual throughputs is used instead of a linear interpolation based on a small number of pieces of data, a finer evaluated value distribution as compared to the first embodiment described earlier is obtained. As a result, according to the second embodiment, accuracy of a tentative evaluated value distribution improves and a calculation amount of an interpolation operation in the M^{N}-number of iterations of the iterative processing is reduced as compared to the first embodiment described earlier.

Next, the bit rate changing unit 103*a* calculates a tentative overall evaluated value tmp Et QoE[i] with respect to the tentative evaluated value q' [n] and the tentative evaluated value distribution tmp_d_t[n] (step S710). tmp Et QoE[n] is calculated according to Expression (11) below.

$$tmp\_Et\_QoE[i] = 1/D \times \Sigma\_\{n=1\}^\{N\}(q'[n] \times tmp\_d\_t[n])$$

$$D = E\{n=1\}^\{N\}(tmp\_d\_t[n]) \quad (11)$$

Operations of the bit rate changing unit 103*a* in steps S711 to S713 are respectively similar to operations of the bit rate changing unit 103 in steps S411 to S413 according to the first embodiment shown in FIG. 4.

Third Embodiment

Hereinafter, a third embodiment of the present invention will be described with reference to the drawings.

A difference between a configuration of the moving image playback system 1 according to the third embodiment to be described below and the configuration of the moving image playback system 1 according to the first embodiment described earlier is that, among the components of the coded data generation apparatus 100, the bit rate changing unit 103 according to the first embodiment has been replaced with a bit rate changing unit 103b to be described below. Hereinafter, a description will be given with a focus on the differences described above.

[Operations of Bit Rate Changing Unit]

Hereinafter, an example of operations of the bit rate changing unit 103b will be described.

Figure 8:
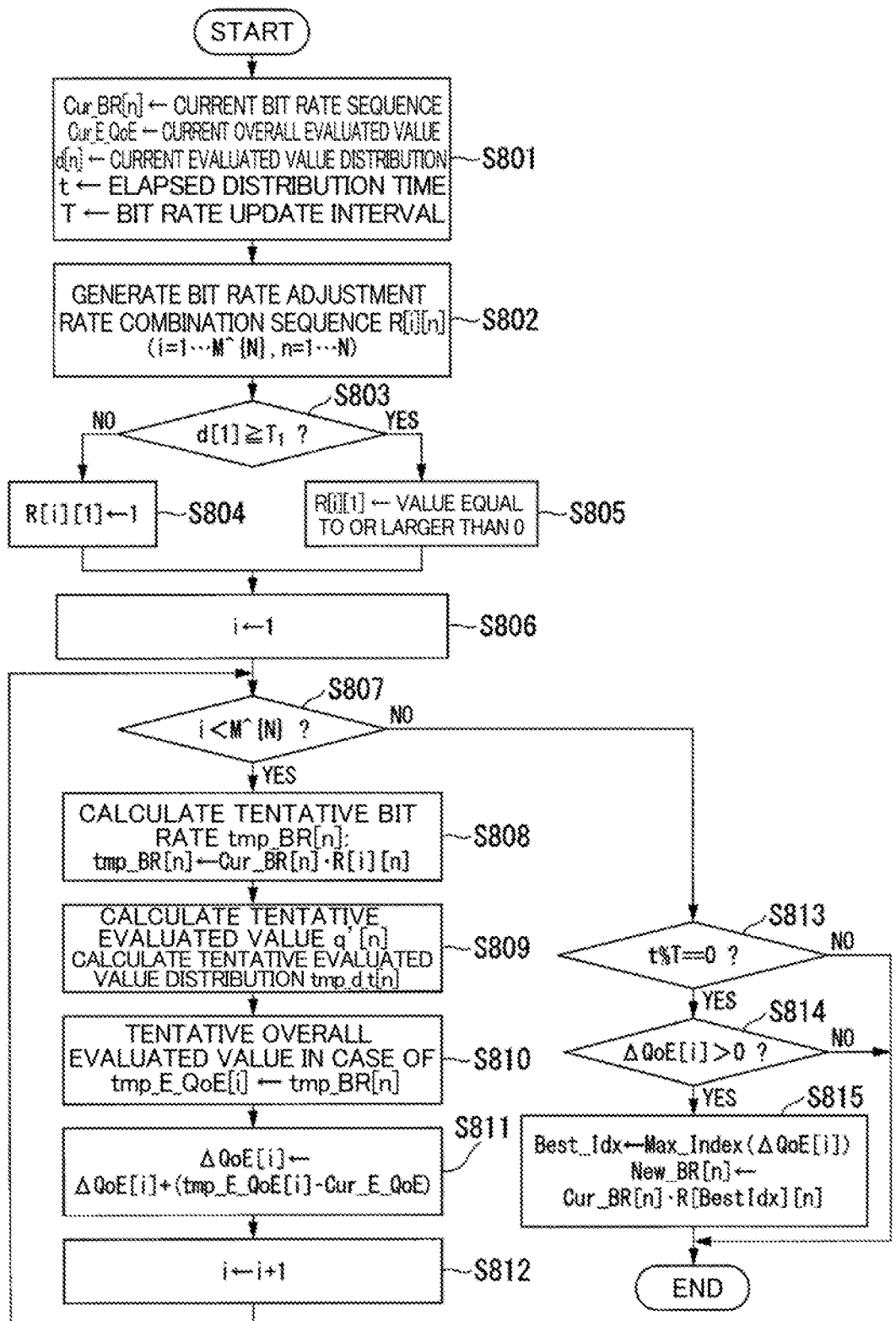
FIG. 8 is a flow chart showing operations of a bit rate changing unit 103b according to a third embodiment of the present invention.

FIG. 8 is a flow chart showing operations of the bit rate changing unit 103b according to the third embodiment of the present invention. In FIG. 8, a leftward arrow "←" represents a substitution of a value from a right side to a left side.

The bit rate changing unit 103 according to the first embodiment described earlier and the bit rate changing unit 103a according to the second embodiment described earlier are configurations in which a new bit rate is constantly set with respect to each coding unit 105. By comparison, the bit rate changing unit 103b according to the third embodiment is a configuration in which a combination of bit rates that produces a maximum overall evaluated value among cumulative evaluated values during a certain period of time is set with respect to each coding unit 105. The present configuration will be described in greater detail below.

The bit rate changing unit 103b acquires information indicating bit rate information Cur_BR[n] at the current moment, an overall evaluated value Cur_E_QoE at the current moment, an evaluated value distribution d[n] at the current moment, an elapsed distribution time t, and a bit rate update interval T that represents a predetermined time interval from, for example, the control unit 106 (step S801). It should be noted that the bit rate update interval T is a longer time interval than a predetermined time interval to be segmented. In addition, in a similar manner to the operation of steps S402 of the bit rate changing unit 103 according to the first embodiment shown in FIG. 4, the bit rate changing unit 103b generates a bit rate adjustment combination sequence R[i] [n] (step S802).

Operations of the bit rate changing unit 103b in steps S803 to S810 are respectively similar to the operations of the bit rate changing unit 103 in steps S403 to S410 according to the first embodiment shown in FIG. 4.

The bit rate changing unit 103b calculates a difference between a tentative overall evaluated value tmp_E_QoE[i] that is an overall evaluated value when a bit rate is changed and an overall evaluated value Cur_E_QoE at the current moment. The bit rate changing unit 103b adopts a cumulative value of the calculated difference as an evaluated value difference cumulative value ΔQoE[i] (step S811).

After calculating i=1, . . . , M^{N}-number of overall evaluated values based on the bit rate adjustment rate combination sequence R[i] [n], the bit rate changing unit 103b determines whether or not the elapsed distribution time t has reached the bit rate update interval T (step S813). When the elapsed distribution time t has reached the bit rate update interval T (step S813: Y) and the evaluated value difference cumulative value ΔQoE[i] is a positive value (step S814: Y), the bit rate changing unit 103b calculates an index Best_Idx that maximizes the evaluated value difference cumulative value ΔQoE[i]. The bit rate changing unit 103b calculates a new bit rate sequence New BR[n] according to Expression (12) below based on a bit rate adjustment rate combination sequence R[Best_Idx] [n] with respect to Best_Idx (step S815).

$$\text{New\_}BR[n]=\text{Cur\_}BR[n]\cdot R[\text{Best\_Idx}][n] \qquad (12)$$

When the elapsed distribution time t has not reached the bit rate update interval T (step S813: N) or the evaluated value difference cumulative value ΔQoE[i] is a value equal to or lower than 0 (step S814: N), the bit rate changing unit 103b does not calculate a new bit rate sequence. In other words, coding is performed in each coding unit 105 using the bit rate sequence at the current moment as it is. This concludes the operations of the bit rate changing unit 103b indicated by the flow chart shown in FIG. 8.

In this manner, the bit rate changing unit 103b sets a new bit rate sequence to each coding unit 105 based on a bit rate adjustment rate that maximizes an overall evaluated value during a bit rate update interval T. As a result, according to the third embodiment, a bit rate sequence that increases an overall evaluated value while reducing the number of times a bit rate is updated can be obtained. At this point, either a configuration in which the evaluated value difference cumulative value ΔQoE [i] is reset to 0 every time a new bit rate sequence is obtained or a configuration in which processing is continued while retaining the evaluated value difference cumulative value ΔQoE[i] at the current moment may be adopted.

The coded data generation apparatus 100 in the embodiments described above may be realized by a computer. In this case, a program for realizing the functions may be recorded in a computer-readable recording medium and the program recorded in the recording medium may be realized by having a computer system load and execute the program. It is assumed that a "computer system" as used herein includes an OS and hardware such as peripheral devices. In addition, a "computer-readable recording medium" refers to a portable medium such as a flexible disk, a magneto-optical disk, a ROM, or a CD-ROM or a recording apparatus such as a hard disk that is built into the computer system. Furthermore, a "computer-readable recording medium" may also include a recording medium that dynamically holds the program for a short period of time such as a communication wire when the program is to be transmitted via a network such as the Internet or a communication line such as a telephone line or a recording medium that holds a program for a certain period of time such as a volatile memory inside a server or a computer system to become a client. Moreover, the program described above may be any of a program for realizing a part of the functions described above, a program capable of realizing the functions described above in combination with a program already recorded in a computer system, and a program for realizing the functions using a programmable logic device such as an FPGA (Field Programmable Gate Array).

While embodiments of the present invention have been described in detail with reference to the drawings, it is to be understood that specific configurations are not limited to these embodiments and that the present invention also includes designs and the like which do not constitute departures from the gist of the present invention.

REFERENCE SIGNS LIST

100 Coded data generation apparatus
101, 101a Evaluation acquiring unit 102, 102a Overall evaluated value calculating unit
103, 103a, 103b Bit rate changing unit
104 Moving image converting unit
105 (105-1 to 105-N) Coding unit
106 Control unit
200 Distribution server
300 Moving image playback apparatus group
301 (301-1 to 301-M) Moving image playback apparatus
400 Evaluated value collection server

The invention claimed is:

1. A coded data generation method of generating coded data of a plurality of bit rates in which an image is encoded, the coded data generation method comprising the steps of:
acquiring an evaluated value at distribution destinations of the generated coded data when the coded data is reproduced;
calculating an overall evaluated value which indicates the evaluated value acquired at the distribution destinations as a whole;
calculating a difference between the overall evaluated value in a case where the bit rate is changed and the overall evaluated value at the current moment at a predetermined time interval; and
changing the bit rate of the coded data to be generated based on a distribution of the acquired evaluated value in all channels, where the bit rate of a predetermined channel is changed to maximize a cumulative value of the difference at a time interval longer than the predetermined time interval.

2. The coded data generation method according to claim 1, wherein the step of changing the bit rate changes the bit rate such that the larger the ratio of higher evaluated values, the larger the number of pieces of coded data with higher bit rates, and changes the bit rate such that the larger the ratio of lower evaluated values, the larger the number of pieces of coded data with lower bit rates.

3. The coded data generation method according to claim 1, wherein the evaluated value is a value representing a subjective quality at the distribution destinations or a throughput of a network at the distribution destinations.

4. The coded data generation method according to claim 2, wherein the step of changing the bit rate changes a frame rate instead of changing the bit rate or changes both the bit rate and the frame rate.

5. The coded data generation method according to claim 1, wherein the step of calculating an overall evaluated value adopts an average value of the evaluated values calculated from the evaluated value at each bit rate and the number of pieces of coded data of each bit rate as the overall evaluated value.

6. The coded data generation method according to claim 1, wherein the step of changing the bit rate does not change the bit rate with respect to the channel that represents a highest-order bit rate and the channel that represents a lowest-order bit rate.

7. A non-transitory computer-readable medium having computer-executable instructions that, upon execution of the instructions by a processor of a computer, cause the computer to function as the coded data generation method according to claim 1.

8. A coded data generation apparatus which generates coded data of a plurality of bit rates in which an image is encoded, the coded data generation apparatus comprising:
a processor; and
a storage medium having computer program instructions stored thereon, when executed by the processor, perform to:
acquires an evaluated value at distribution destinations of the generated coded data when the coded data is reproduced;
calculate an overall evaluated value which indicates the evaluated value acquired at the distribution destinations as a whole;
calculate a difference between the overall evaluated value in a case where the bit rate is changed and the overall evaluated value at the current moment at a predetermined time interval; and
changes the bit rate of the coded data to be generated based on a distribution of the acquired evaluated value in all channels, where the bit rate of a predetermined channel is changed to maximize a cumulative value of the difference at a time interval longer than the predetermined time interval.

9. The coded data generation apparatus of claim 8 wherein the bit rate is changed such that the larger the ratio of higher evaluated values, the larger the number of pieces of coded data with higher bit rates, and changes the bit rate such that the larger the ratio of lower evaluated values, the larger the number of pieces of coded data with lower bit rates.

10. The coded data generation apparatus of claim 8 wherein the evaluated value is a value representing a subjective quality at the distribution destinations or a throughput of a network at the distribution destinations.

* * * * *